(12) United States Patent  
Neudorf et al.

(10) Patent No.: US 7,581,597 B2  
(45) Date of Patent: Sep. 1, 2009

(54) SYSTEM FOR AND METHOD OF MOVING AN AGRICULTURAL IMPLEMENT BETWEEN A FOLDED, INOPERATIVE POSITION AND AN EXTENDED, OPERATIVE POSITION

(75) Inventors: Blake R. Neudorf, Warman (CA); Jim W. Henry, Saskatoon (CA); Terry A. Friggstad, Grasswood (CA)

(73) Assignee: CNH Canada, Ltd. (CA)

( * ) Notice: Subject to any disclaimer, the term of this patent is extended or adjusted under 35 U.S.C. 154(b) by 449 days.

(21) Appl. No.: 11/404,699

(22) Filed: Apr. 14, 2006

(65) Prior Publication Data

US 2007/0240889 A1    Oct. 18, 2007

(51) Int. Cl.
    *A01B 49/00*    (2006.01)
(52) U.S. Cl. .......................................... 172/311; 172/1
(58) Field of Classification Search ............... 172/1, 172/311, 452, 456; 111/54, 55; 56/134, 56/159, 228; 91/526, 536
    See application file for complete search history.

(56) References Cited

U.S. PATENT DOCUMENTS

| 3,333,645 | A | * | 8/1967  | Gustafoson | 172/456 |
| 3,539,016 | A | * | 11/1970 | Bauer et al. | 172/311 |
| 3,548,954 | A | * | 12/1970 | Lindemann | 172/311 |
| 4,117,893 | A | * | 10/1978 | Kinzenbaw | 172/311 |
| 4,126,187 | A | * | 11/1978 | Schreiner et al. | 172/311 |
| 4,350,211 | A | * | 9/1982  | Coufal | 172/311 |
| 5,143,160 | A | * | 9/1992  | May | 172/311 |
| 5,158,145 | A | * | 10/1992 | Karchewski | 172/548 |
| 5,251,704 | A | * | 10/1993 | Bourgault et al. | 172/311 |
| 5,305,590 | A | * | 4/1994  | Peeters | 56/377 |
| 5,839,516 | A | * | 11/1998 | Arnold et al. | 172/456 |
| 6,035,942 | A | * | 3/2000  | Smith et al. | 172/311 |
| 6,260,630 | B1 | * | 7/2001 | Friggstad | 172/311 |
| 6,336,511 | B1 |   | 1/2002 | Friggstad |  |
| 6,371,215 | B2 |   | 4/2002 | Friggstad |  |
| 6,374,921 | B1 |   | 4/2002 | Friggstad |  |

* cited by examiner

*Primary Examiner*—Thomas B Will  
*Assistant Examiner*—Matthew D Troutman  
(74) *Attorney, Agent, or Firm*—Rebecca Henkel

(57) ABSTRACT

A method of and system for moving an agricultural implement between a folded, inoperative system for transport and an extended, field position is provided. The method includes the steps of providing an agricultural implement having a right wing of tools and a left wing of tools each located on opposite sides of a central longitudinal axis of the implement relative to each other; moving one of the right and left wings of tools from an extended position to a folded, inoperative position for transport; and moving the other of the right and left wings of tools from an extended position to a folded, inoperative position for transport after the step of moving one of the right and left wings.

16 Claims, 8 Drawing Sheets

SYSTEM FOR AND METHOD OF MOVING AN AGRICULTURAL IMPLEMENT BETWEEN A FOLDED, INOPERATIVE POSITION AND AN EXTENDED, OPERATIVE POSITION

RELATED APPLICATIONS

Not applicable.

BACKGROUND OF THE INVENTION

1. Field of the Invention

The invention relates to an agricultural implement and, more particularly, relates to a system for a method of moving a toolbar of an agricultural implement between an extended field position and a folded position for transport.

2. Discussion of the Related Art

Modern farmers strive to improve the management of the increasing amounts of farm acres. Improving management requires farmers to be able to quickly prepare the soil and plant seed each season. This haste has driven the need for more efficient and larger agricultural machinery.

Implements such as harrows, packers, or combined harrow-packers are being made with widths exceeding sixty feet in the field operating position. Also, drill implements employed to distribute seed product across an agricultural field are also being made increasingly wider in the field operating position.

As agricultural implements are made increasingly wider, there is a need for systems to compactly fold the implement for practical and safe transport over highways and through gates. Conventional folding systems have simultaneously folded both left-hand and right-hand sides of the implement so as to balance the wheeled frame assembly about its central longitudinal axis. However, mistaken train of thought is known to increase opportunities of unbalance of the implement in the fore and aft direction. Specifically, raising the both the left-hand and right-hand booms or wings of an implement, stretched out in the field position, in the vertical direction increases opportunities for the tow vehicle or the implement to be undesirably tilted or lifted from the ground.

SUMMARY OF THE INVENTION

The present invention provides a method of and system for folding an agricultural implement that addresses the drawbacks described above.

In a first embodiment of the present invention, a method of moving an agricultural implement between a folded, inoperative system for transport and an extended, field position is provided. The method includes the steps of providing an agricultural implement having a right wing of tools and a left wing of tools each located on opposite sides of a central longitudinal axis of the implement relative to each other; moving one of the right and left wings of tools from an extended position to a folded, inoperative position for transport; and moving the other of the right and left wings of tools from an extended position to a folded, inoperative position for transport after the step of moving one of the right and left wings.

A first boom supports the one of the right and left wings and a second boom supports the other of the right and left wings for movement in a horizontal direction about a vertical axis between extended and folded positions. In the preferred method, the step of moving one of the right and left wings includes lifting one of the right wing and the left wing of tools upwardly in a vertical direction about a horizontal axis while the other of the right and left wings of tools remains stationary relative to the implement. The step of moving one of the right and left wings further includes rotating the first boom in support of the one of the raised right and left wings rearwardly in a horizontal direction about a first vertical axis relative to a forward direction of travel while the second boom is stationary. The step of moving the other of the right left wings includes lifting the other of the right and left wings of tools upwardly in a vertical direction about a horizontal axis. The step of moving the other of the right and left wings of tools further includes rotating the second boom in support of the other of the right and left wings of tools rearwardly in the horizontal direction about a second vertical axis different than the first vertical axis. The step of moving the other of the right and left wings of tools occurs after the step of rotating the first boom assembly rearwardly about the first vertical axis in the horizontal direction. The step of rotating the second boom assembly occurs after the step of moving the other of the right and left wings of tools.

In another embodiment, the present invention provides an agricultural implement that includes a first boom in support of a first wing of tools located on one side of a central longitudinal axis of the implement, a second boom in support of a second wing of tools located on another side of the central longitudinal axis opposite the first boom and the first wing of tools, and a system configured to rotate a first wing of tools upwardly in a vertical direction about a horizontal axis and then rotate the first boom in support of the first wing of tools about a vertical axis in a horizontal direction while the second wing of tools and the second boom are stationary.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
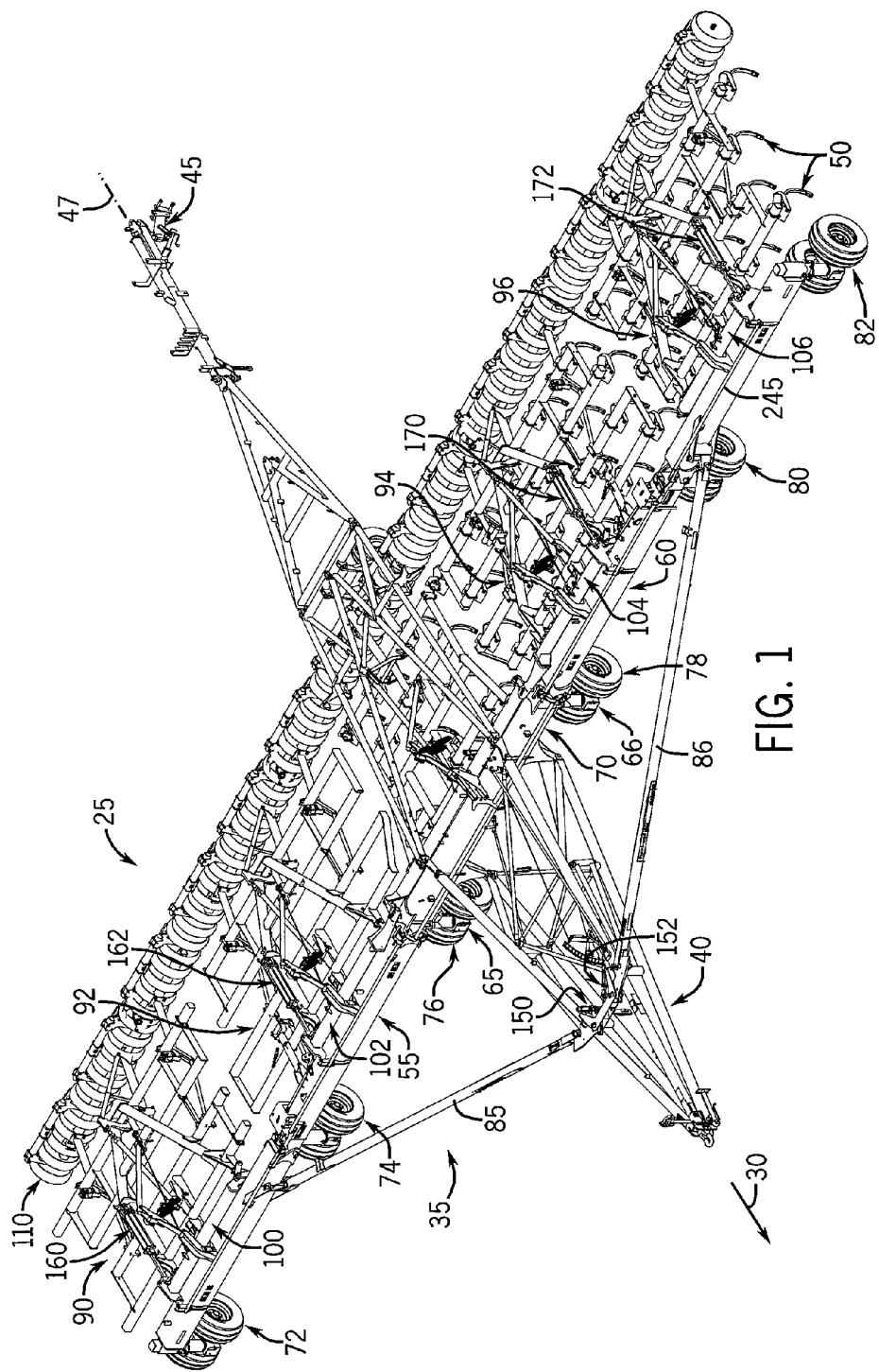
FIG. 1 illustrates a perspective view of an implement in combination with a system for folding the implement in accordance with the present invention, the implement in the extended, operative position for the field.

Referring to FIGS. 1-8, an exemplary embodiment of the system 20 (See FIG. 8) in accordance with the present invention employed in folding an agricultural implement 25 (FIGS. 1-7) is shown. For sake of description, right and left references are used herein as a matter of convenience, and are determined by standing at the rear of the implement 25 looking in a forward direction of travel 30.

The exemplary agricultural implement 25 is typically referred to as a drill implement. The implement 25 generally includes a carrier frame assembly 35 having a A-shaped forward hitch 40 and an A-shaped rearward hitch 45 aligned along a central longitudinal axis 47. The exemplary carrier frame assembly 35 is generally configured to support a series of agricultural tools 50 to be employed in the field as the carrier assembly 35 is towed in the forward direction of travel 30.

The carrier frame assembly 35 includes a right boom 55 and a left boom 60 each pivotally connected via a king post 65 and 66 to a stationary center frame structure 70. Each right and left boom 55 and 60 is pivotally movable between a transversely extending working position (See FIG. 1), and a longitudinally extending transport position (See FIG. 6). Accordingly, the extended right and left booms 55 and 60 are generally transversely aligned relative to the direction of travel 30, and the folded right and left booms 55 and 60 are generally aligned with the direction of travel 30.

Each right and left boom 55 and 60 and the central frame structure 70 of the carrier frame assembly 35 is movably supported by a series of caster wheel assemblies 72, 74, 76, 78, 80 and 82 are operable to freely caster or pivot about a vertical axis. In the extended position as shown in FIG. 1, each right and left boom 55 and 60 is connected by a structural draft link 85 and 86 extending forwardly therefrom and pivotally connected at the forward hitch 40.

The right and left booms 55 and 60 are mounted by rearwardly extending toolbar sub-frames or wings 90, 92, 94 and 96 pivotally rotatable relative thereto about a horizontal axis defined by wing pivot assemblies 100, 102, 104 and 106, respectively for movement between the lowered operating position and the raised, generally vertical non-working position. An additional fixed toolbar subframe 98 is connected at the central frame structure 70. Each pivotal wing 90, 92, 94 and 96 and fixed toolbar sub-frame 98 supports the transverse rows of tools 50. The pivot assemblies 100, 102, 104 and 106 are located generally rearwardly in the horizontal direction from the right and left booms 55 an 60. The pivot assemblies 100, 102, 104 and 106 allow the respective wings 90, 92, 94 and 96 and tools 50 mounted thereon to be moved or float independently or simultaneously relative to one another. Even though only a partial number of tools 50 are shown mounted on the wings 90, 92, 94 and 96, it is understood that the number and type of tools 50 is not limiting on the invention. The weight of each wing 90, 92, 94 and 96 is movably supported from the ground by support wheel assemblies 110.

The system 20 of the invention is employed on the implement 25 to move right-side wings 90 and 92 and the right boom 55 between an extended, operative position and a folded, inoperative position independent of the left-side wings 94 and 96 and left boom 66.

Figure 8:
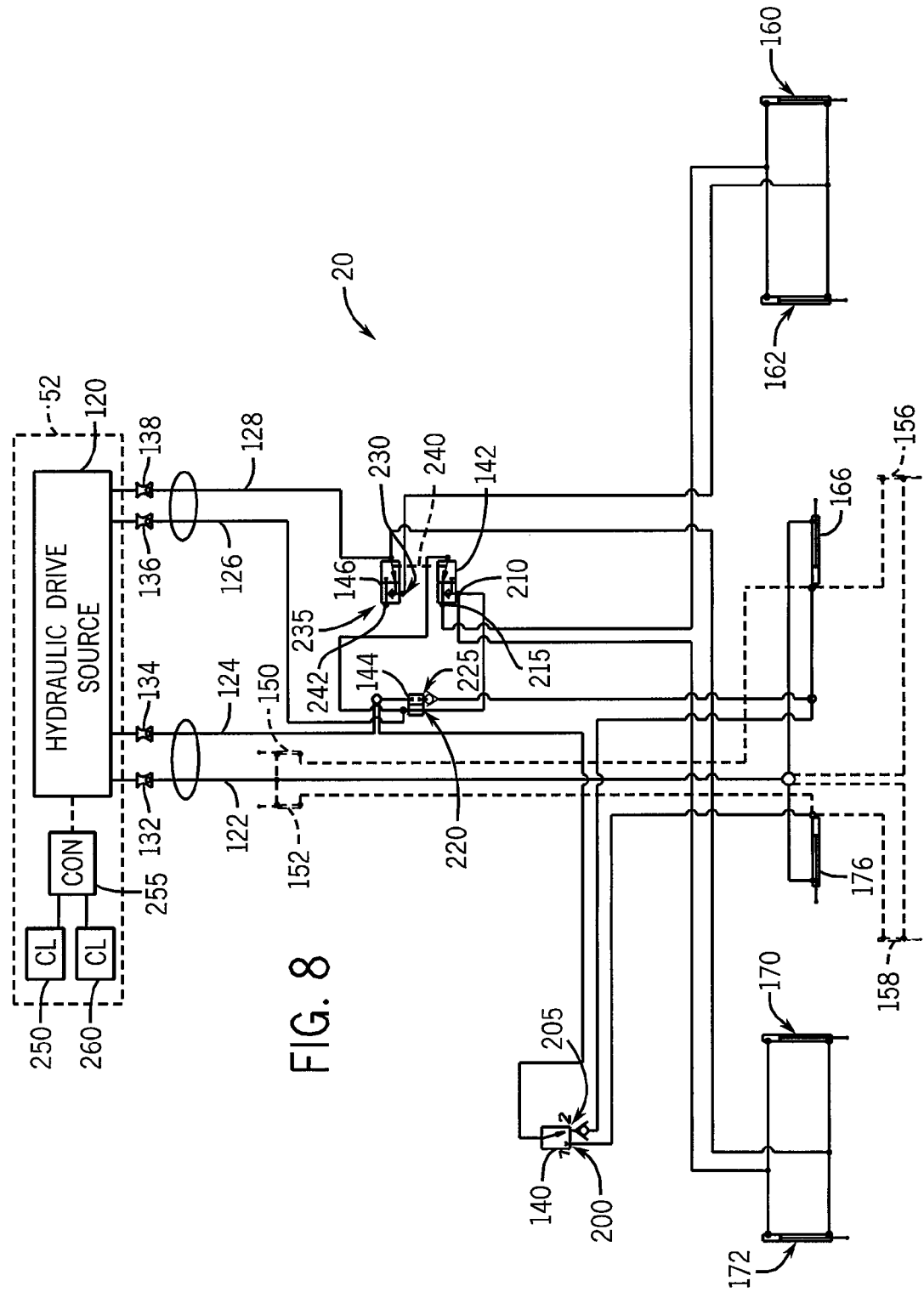
FIG. 8 illustrates a schematic diagram of a hydraulic system of the present invention employed to operate the various hydraulic devices employed in moving the implement between an extended, operative position for the field and a folded, inoperative position for transport as shown in FIGS. 1-7.

FIG. 8 illustrates the preferred embodiment of the system 20 in accordance with the present invention. The exemplary system 20 in accordance with the present invention includes a hydraulic drive 120 (e.g., a reservoir and hydraulic pump typically driven in a conventional manner by a power take-off unit operatively connected to the engine of a tow vehicle or prime mover). The hydraulic drive 120 is connected in fluid communication to provide a pressurized fluid flow to, or otherwise receive a return fluid flow from, one or more of hydraulic lines 122, 124, 126 and 128.

Hydraulic lines 122 and 124 are connected in fluid communication to quick connect couplings 132 and 134, respectively, and hydraulic lines 126 and 128 are connected in fluid communication to quick connect couplings 136 and 138, respectively. It is understood that the type of interconnecting hydraulic line or conduit 122, 124, 126 and 128 (e.g., hose, pipe, tube, etc.) employed in the hydraulic system 20 described herein depends on the particular flow rates, pressures, and degree of flexing due to, for example, vibration or flex of the carrier frame assembly 35 of the implement 25.

The hydraulic lines 122, 124, 126, and 128 are connected in fluid communication via a valve network 140, 142, 144 and 146 to selectively drive one or more of hitch latch cylinders 150 and 152, caster-wheel latch cylinders 156 and 158, right wing lift actuators 160 and 162, right boom actuator 166, left wing actuators 170 and 172 and left boom actuator 176. The preferred valves are rotary valves configured with mechanical linkages (not shown) operable to control communication of fluid therethrough. Valve 140 is selectively adjustable to communicate a fluid flow through one of two ports 200 and 205. Valve 142 is selectively adjustable to communicate a fluid flow through one of two outlet ports 210 and 215. Valve 144 is selectively adjustable to communicate a fluid flow through one of two outlet ports 220 and 225. Valve 146 is selectively adjustable to communicate a fluid flow through one of two ports 230 and 235. The valves 142 and 146 are mechanically connected by a linkage 240 to move simultaneously between positions. Port 235 is inserted by a plug 242 to prevent fluid flow therethrough.

It should be understood that not all of the above-described hydraulic devices 150, 152, 156, 158, 160, 162, 166, 170, 172 and 176 are required for operation of the system 20 of the invention. Also, it should be understood that the system 20 can include additional miscellaneous types of hydraulic devices not shown and is not limiting on the invention.

The valve network 140, 142, 144 and 146 generally allows the right wing actuators 160 and 162 and/or right boom actuator 166 to independently move the respective wings 90 and 92 and/or right boom 55 while the left wing actuators 170 and 172 and left boom actuator 176 remain stationary.

Having described the general construction of system 20 in combination with the planting implement 25 of the present invention, the following is a description of how the system 20 operates in independently folding one-side of the implement 25 at a time between folded and extended positions.

Figure 2:
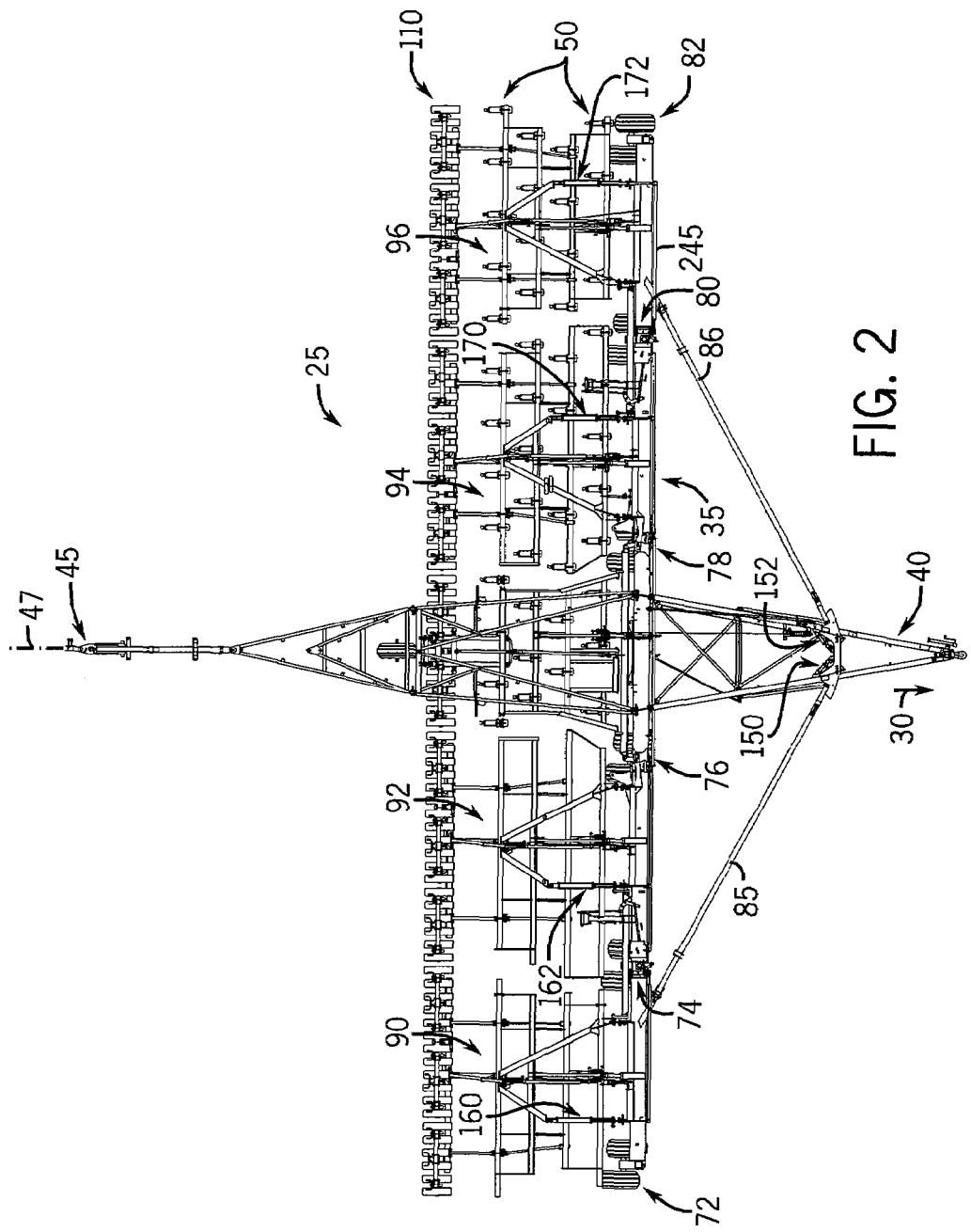
FIG. 2 illustrates a top plan view of the implement and system illustrated in FIG. 1
Figure 3:
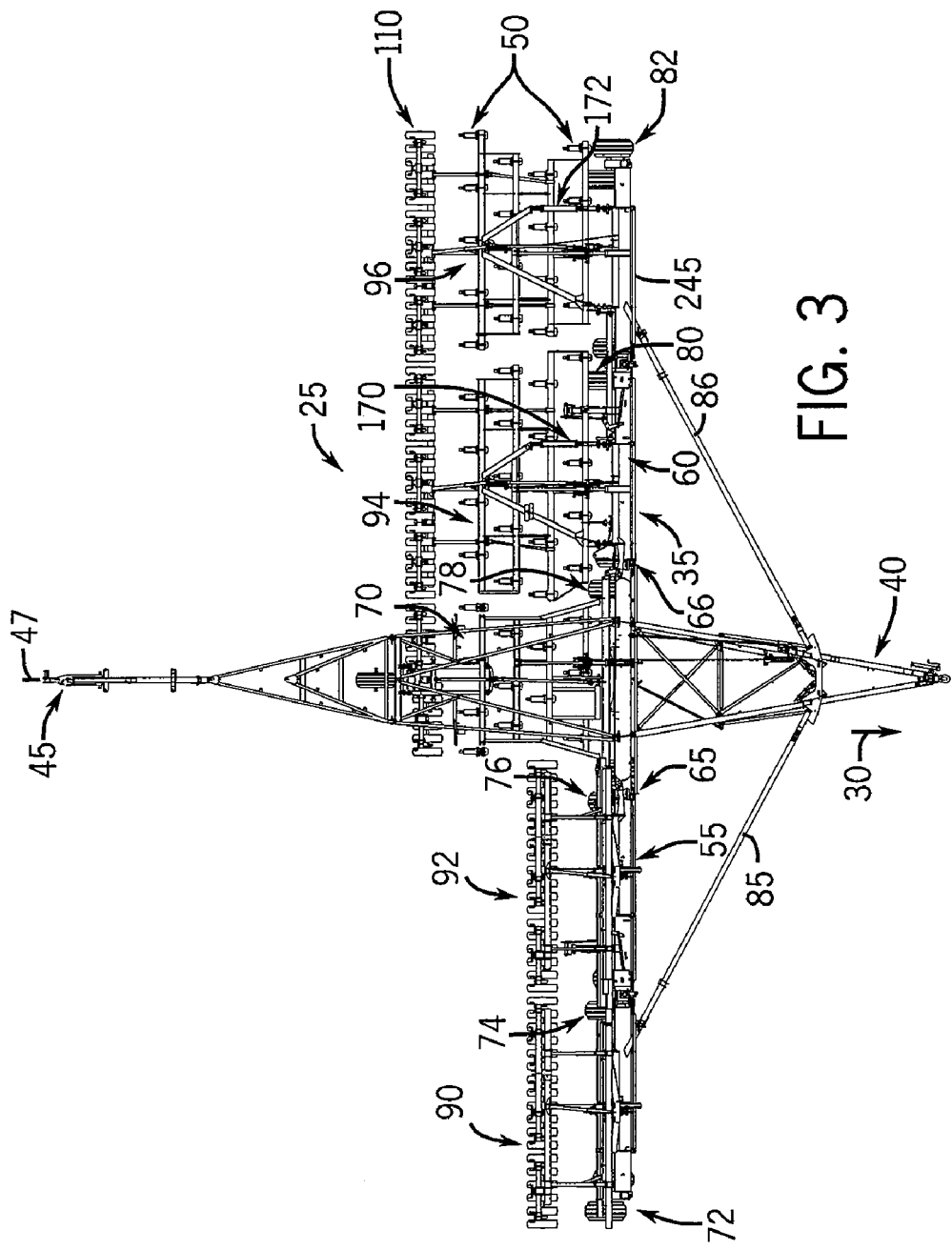
FIG. 3 illustrates a top plan view of the implement and system shown in FIG. 1, the right wing of the implement raised in the vertical direction.
Figure 4:
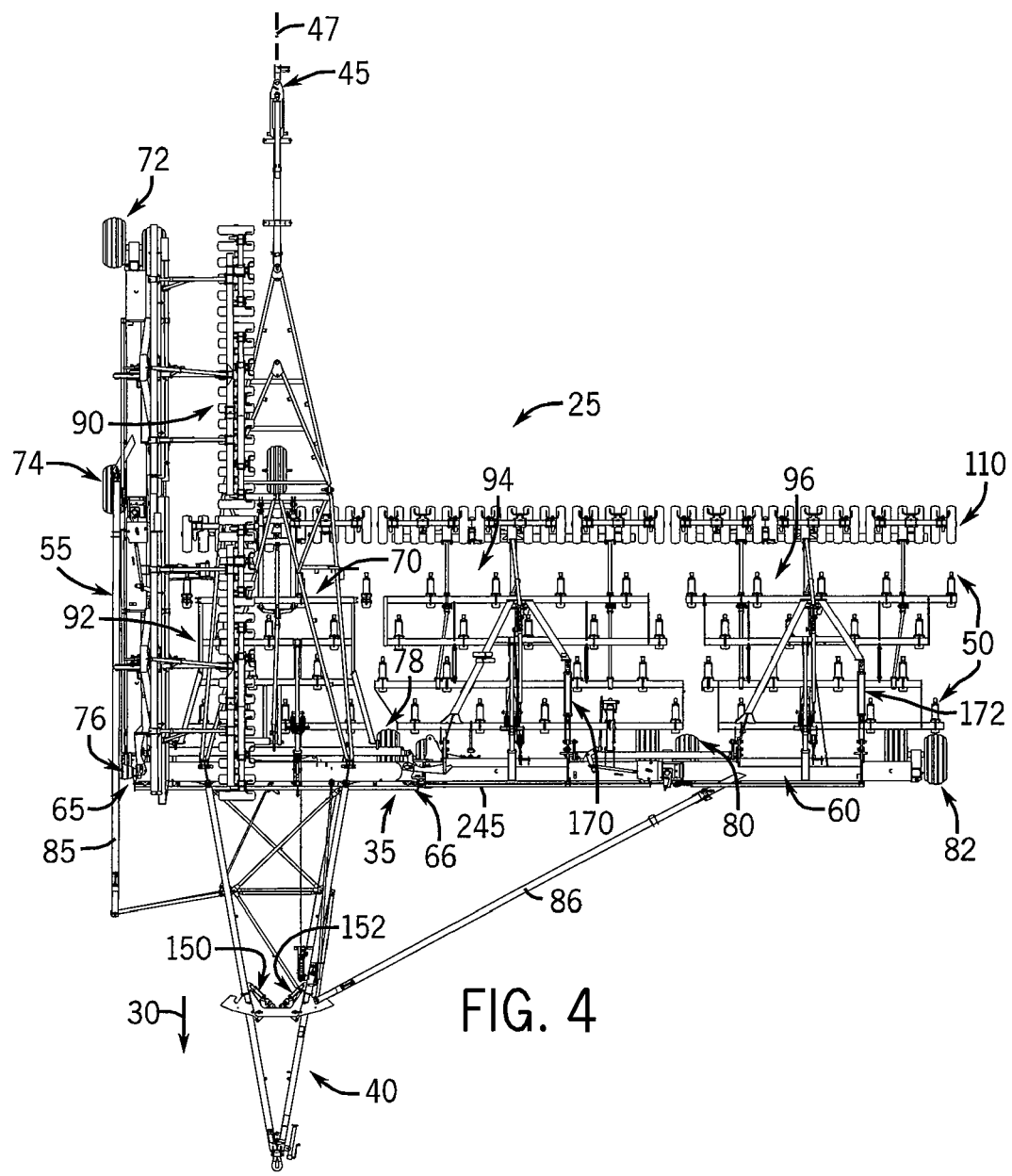
FIG. 4 illustrates a top plan view of the implement and system shown in FIG. 1, the right wing raised and the right boom folded rearward in the horizontal direction.
Figure 5:
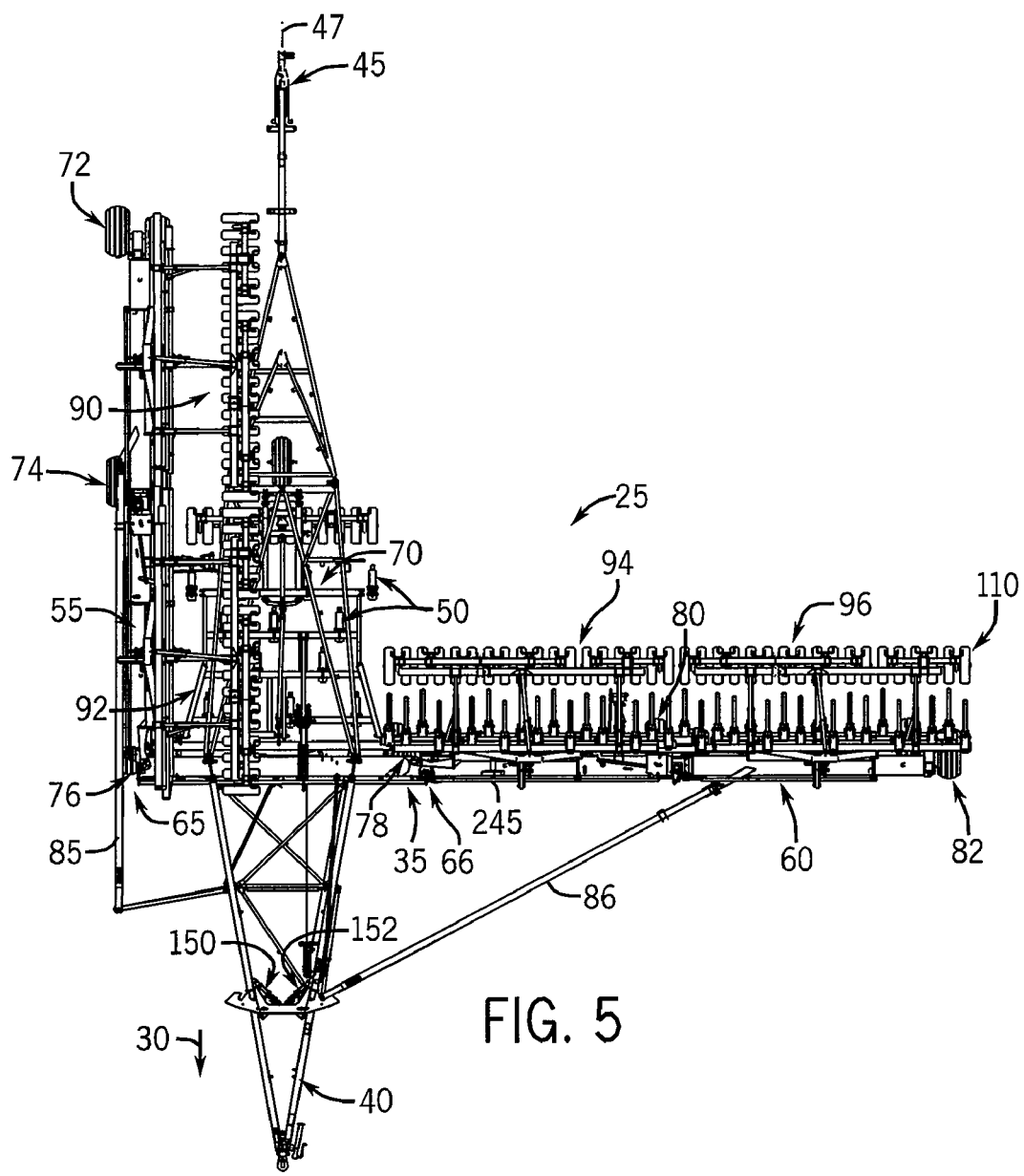
FIG. 5 illustrates a top plan view of the implement and system shown in FIG. 1, the right and left wings raised in the vertical direction and the right boom folded rearward in the horizontal direction.
Figure 6:
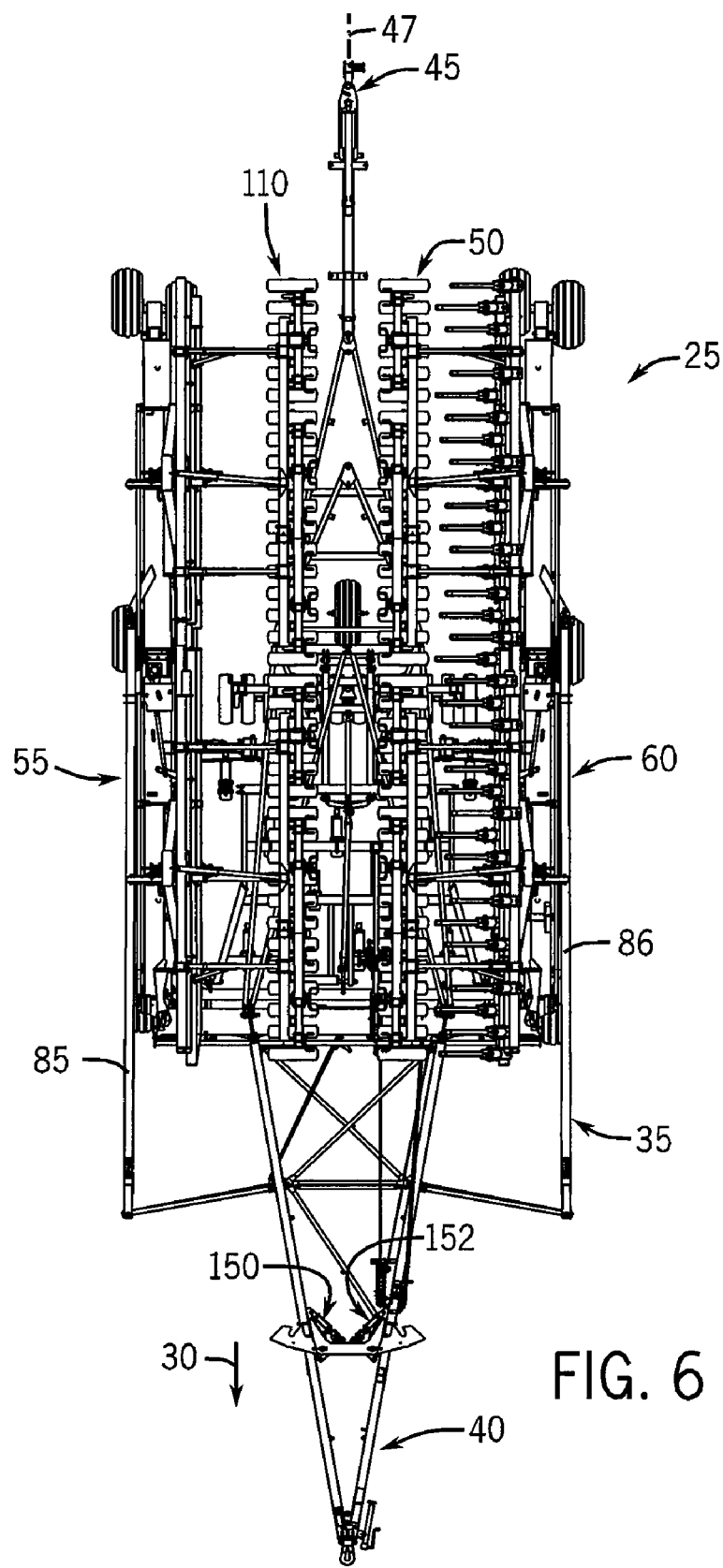
FIG. 6 illustrates a top plan view of the implement and system shown in FIG. 1, both right and left booms and wings moved to a folded, inoperative position ready for transport.
Figure 7:
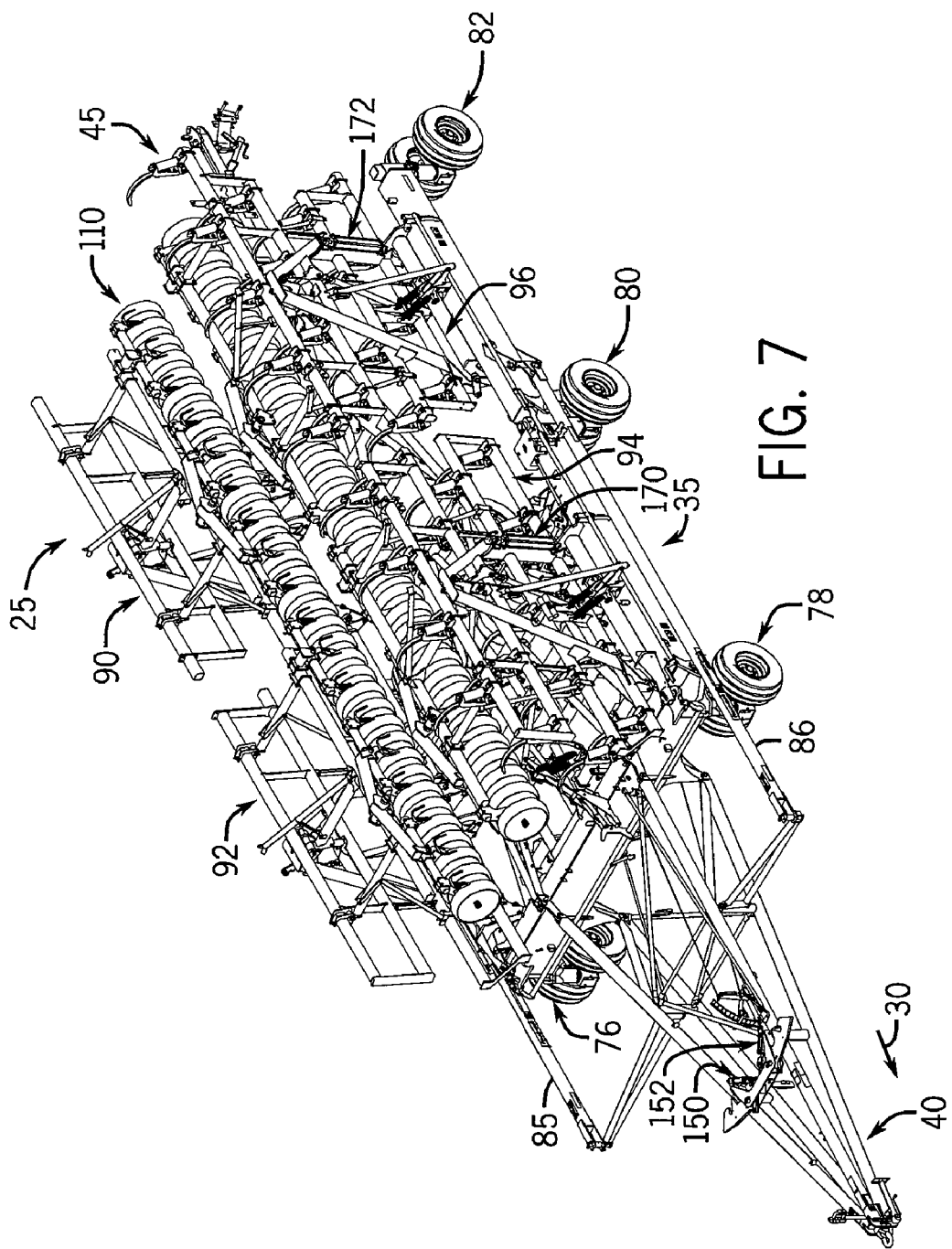
FIG. 7 illustrates a perspective view of the implement and system shown in FIG. 6.

Assume, for example, that the implement 25 is in the extended, operative position in a field (See FIGS. 1 and 2). Hitch latch cylinder actuators 150 and 152 are in an extended position to hold the structural draft links 85 and 86 connected at the forward hitch 40. The caster-wheel latch cylinder actuators 156 and 158 are in extended positions and unlatched to selectively allow the center caster-wheel assemblies 76 and 78, respectively, to rotate freely about a vertical axis. The outer caster wheel assemblies 72, 74 80 and 82 continuously rotate freely about a vertical axis. The boom swing cylinder actuators 166 and 176 are in extended positions so as to extend the right and left booms 55 and 60 in the traverse orientation relative to the forward direction of travel 30 for operation in the field. All of the hydraulic actuators 150, 152, 156, 158, 160, 162, 166, 170, 172 and 176 are in extended positions when the system 20 positions the implement 25 in the extended position for operation in the field.

Each wing 90, 92, 94, and 96 floats independently via the respective wing lift actuators 160, 162, 170 and 172 relative to one another. Yet, with the wings 90, 92, 94 and 96 in the lowered, operative position in the ground, the wing lift actuators 160, 162, 170 and 172 are selectively connected in parallel fluid communication with one another so as to provide simultaneously adjustment of the working depth of the tools 50 relative to the ground. The independent movement of any particular wings 90, 92, 94 and 96 forces hydraulic fluid flow to all of the wing lift actuators 160, 162, 170 and 172.

In operation in the field, the wing lift actuators 160, 162, 170 and 172 move between a partially extended position to cause movement of the respective wings 90, 92, 94, and 96 between a headland valve (not shown), and a fully extended position to cause movement of the wings 90, 92, 94, and 96 to their max downward depth into the ground. In the field position, the valves 140, 142, 144 and 146 are configured or positioned such that ports 205, 215, 225, and 230 are open and ports 200, 210, 220 and 235 are closed. A catch lever or lock shaft 245 (See FIGS. 1-5) regulates in a conventional manner whether the wing lift actuators 160, 162, 170, and 172 move the respective wings 90, 92, 94 and 96 to control depth in the ground, or move the wings 90, 92, 94, and 96 upward in the vertical direction to an inoperative, transport position. If the lock shaft 245 is not caught by at least one of the wings 90, 92, 94, and 96, the wing lift actuators 160, 162, 170, and 172 operate to control depth of the tools 50 mounted on the wings 90, 92, 94, and 96 relative to the ground for operation of the implement 25 in the field.

If the lock shaft 245 is caught and snapped on or activated by at least one of the wings 90, 92, 94, and 96, the movement of the lock shaft 245 causes actuation of the valve network 140, 142, 144 and 146 such that ports 205, 215, 225 and 230 are open and ports 200, 210, 220, and 235 are closed. This positioning of the valve network 140, 142, 144 and 146 activates lines 136 and 138 to actuate the right wing lift actuators 160, 162, while lines 132 and 134 remain inactive such that the left wing lift actuators 170 and 172 remain stationary.

The exemplary system 20 of the invention is configured to initiate folding the implement 25 from the field position to a folded, transport position by initially independently actuating the right wing lift actuators 160 and 162 to raise the right wings 90 and 92 respectively independently while the left wings 94 and 96 remain stationary in the lowered position. However, it should be understood that the invention could be alternatively modified such that the left wing lift actuators 170 and 172 independently raise the respective left wings 94 and 96 while the right wings 90 and 92 remain stationary in the lowered position.

To initiate raising the wings 90 and 92, an operator actuates a control lever 250 at a controller 255 at a prime mover 52 so as to cause positive hydraulic pressure through line 126, and line 128 is open to drain. The positive pressure fluid flow through line 126 causes the right wing lift actuators 160 and 162 to fully retract so as to lift the right wings 90 and 92 upwardly in the vertical direction in general vertical alignment in a raised, inoperative position for transport (See FIG. 3).

Next, the operator actuates a second lever 260 operatively connected to provide positive pressure fluid flow through line 134, and line 132 is open to drain. The positive pressure fluid flow through line 134 causes the right hitch latch cylinder 150 to retract so as to unlatch the structural link 85 from the forward hitch 40. The positive pressure fluid flow through line 134 also causes the right boom actuator 166 to fully retract so as to cause the right boom 55 to pivot about the kingpost 65 rearwardly in a horizontal direction towards a folded position for transport (See FIG. 4). The positive pressurized fluid flow to line 124 also causes unlatching of a right boom lock lever (not shown) so as to be ready to lock the right boom 55 in the folded position. Also, the positive pressure flow to line 124 also unlatches the caster-wheel latch cylinder 156 so as to prepare to lock the caster wheel 78 in a forward alignment generally inline with the forward direction of travel 30 of the implement 25. The hitch latch cylinder 156 then moves to lock the caster wheel 78 in the forward alignment with forward motion of the implement 25 in the forward direction of travel 30.

When the right boom 55 reaches its folded, inoperative position for transport, the right boom 55 automatically engages and causes movement of the valve network 140, 142, 144 and 146 such that ports 205, 210, 225 and 235 are open and ports 200, 215, 220 and 230 are closed. This valve network 140, 142, 144 ad 146 in this position shuts-down or inactivates the actuators 160, 162 and 166 associated with right wings 90 and 92 and right boom 55, as well as activates the actuators 170, 172 and 176 associated with moving the left wings 94 and 96 and left boom 60, respectively.

Next, an operator actuates the control lever 250 at the controller 255 associated with providing positive pressure to line 138, and opening line 136 to drain. Similar to the step described above to raise the right wings 90 and 92, the positive pressure applied to line 128 causes the left wing actuators 170 and 172 to fully retract and lift the left wings 94 and 96 upwardly in the vertical direction to vertically alignment in a stored, inoperative position for transport (See FIG. 5). Raising the left wings 94 and 96 to the raised position automatically moves the valve network 140, 142, 144 and 146 so that ports 200, 210, 225 and 235 are open and ports 205, 215, 220 and 230 are closed.

Next, the operator actuates the control lever 260 at the controller 255 so as to provide positive fluid pressure to line 134, and to allow line 132 to drain. The positive pressure of fluid to line 134 causes the left boom actuator 176 to retract and swing the left boom 60 rearwardly in the horizontal direction to the folded, inoperative position (See FIGS. 6 and 7). Positioned in the folded position shown in FIGS. 6 and 7, the implement 25 is ready for transport. Notably in the transport position, all of the latch cylinders 150, 152, 156, 158, the wing lift actuators 160, 162, 170, and 172, the boom actuators 166 and 176 are in the fully retracted position for transport.

However, miscellaneous leakage in the system 20 can cause the right and left wings 90, 92, 94, and 96 and/or the right and left booms 55 and 60 to move from the raised, stored position. The position of the valve network 140, 142 144 and 146 of the system 20 in the transport position is configured to allow an operator actuating the control lever 250 at the controller 255 so as to provide positive pressure to line 128 to cause one or both of the right and left wing cylinder actuators 160, 162, 170 and 172 to raise the respective right and left wings 90, 92, 94 and 96 upwardly in the vertical direction, while the right hand boom cylinder actuator 166 remains inactive or shut down. Also, the system 20 in the transport position allows the left boom actuator 176 to remain active such that actuation of the control lever 250 at the controller 255 provides positive pressure fluid flow to line 124 so as to cause the left boom actuator 176 to move the left boom 60 to return to the folded, inoperative position.

To return the implement 25 from the folded, transport position (See FIGS. 6 and 7) to the fully extended, operative position (See FIG. 1), the previously described method described above is generally performed in reverse order. Specifically, actuation of the control lever 260 at the controller 255 causes positive pressure to be provided to line 122, and line 124 is allowed to drain. The positive pressure fluid flow to line 122 causes the left boom actuator 176 to extend the left boom 60 forwardly in the horizontal direction to the fully extended, transverse aligned position. Next, actuation of the control lever 250 at the controller 255 provides positive pressure to line 126, and allows line 128 to drain, so as to cause the left wing lift actuators 170 and 172 to extend and lower the left wings 94 and 96 downwardly in the vertical direction for operation in the field. The left wings 94 and 96 in the lowered position cause ports 205, 210, 225, and 235 to open and ports 200, 215, 220 and 230 to be closed.

Actuation of the control lever 260 at the controller 255 then causes positive pressure to be provided to line 122, and line 124 is allowed to drain so as to cause the right boom actuator 166 to fully extend and move the right boom 55 forwardly in the horizontal direction to the extended, transversely aligned position. Movement of the right boom 55 automatically causes ports 205, 215, 225 and 230 to open and ports 200, 210, 220 and 235 to closed. Next, actuation of the control lever 250 at the controller 255 causes positive pressure to be provided to line 126, and line 128 is allowed to drain so as to cause the right wing actuators 160 and 162 to extend and move the right wings 90 and 92 downwardly in the vertical direction toward the ground to an operative position. The lock shaft 245 is then manually moved to an off position so as to cause ports 205, 215, 220 and 230 to be open and ports 200, 210, 225 and 235 to be closed. Now the system 20 and implement 25 are in the field position for operation in the field such that the right and left wing cylinder actuators 160, 162, 170 and 172 to be in parallel hydraulic communication so as to move in unison and in parallel as dictated by the controller 255.

Many changes and modifications could be made to the invention without departing from the spirit thereof. The scope of these changes will become apparent from the appended claims.

We claim:

1. A method of moving an agricultural implement between a folded, inoperative system for transport and an extended, field position, the method comprising the steps of:
   providing an agricultural implement having a right wing of tools and a left wing of tools each located on opposite sides of a central longitudinal axis of the implement relative to each other;
   connecting a right wing actuator to the right wing of tools and a left wing actuator to the left wing of tools;
   interconnecting the right and left wing actuators to a fluid drive source with a valve assembly, the valve assembly including a first valve and a second valve each in fluid communication with both the right and left wing actuators, each first and second valve including a selector configured to communicate a fluid flow from a single inlet port to one of a first outlet port in fluid communication with left wing actuator and a second outlet port in communication with the right wing actuator, the selector of the first valve mechanically connected to move with the selector of the second valve;
   moving one of the right and left wings of tools from an extended position to a folded, inoperative position for transport in response to the configurations of the selectors of the first and second valves; and
   moving the other of the right and left wings of tools from an extended position to the folded, inoperative position for transport after executing the step of moving one of the right and left wings to the folded, inoperative position in response to the configurations of the selectors of the first and second valves.

2. The method as recited in claim 1, wherein the step of moving one of the right and left wings includes lifting one of the right wing and the left wing of tools upwardly in a vertical direction about a horizontal axis while the other of the right and left wings of tools remains stationary relative to the implement.

3. The method as recited in claim 2, wherein a first boom supports the one of the right and left wings and a second boom supports the other of the right and left wings for movement in a horizontal direction about a vertical axis between extended and folded positions, wherein the step of moving the one of the right and left wings further includes rotating the first boom in support of the one of the raised right and left wings rearwardly in a horizontal direction about a first vertical axis relative to a forward direction of travel while the second boom is stationary.

4. The method as recited in claim 3, wherein the step of moving the other of the right and left wings includes lifting the other of the right and left wings of tools upwardly in a vertical direction about a horizontal axis.

5. The method as recited in claim 4, wherein the step of moving the other of the right and left wings of tools further includes rotating the second boom in support of the other of the right and left wings of tools rearwardly in the horizontal direction about a second vertical axis different than the first vertical axis.

6. The method as recited in claim 5, wherein the step of moving the other of the right and left wings of tools occurs after the step of rotating the first boom assembly rearwardly about the first vertical axis in the horizontal direction.

7. The method as recited in claim 6, wherein the step of rotating the second boom assembly occurs after the step of lifting the other of the right and left wings of tools.

8. A system configured to move right and left wings of tools of an agricultural implement between a folded, inoperative position and an extended, operative position for operation in a field, the implement including a left boom in support of the left wing of tools located on one side of a central longitudinal axis of the implement opposite a right boom in support of the right wing of tools, comprising:
   a valve network located at the implement and in fluid communication with a fluid drive source;
   at least one wing actuator in fluid communication with the valve network, the at least one wing actuator configured to rotate one of the right and left wings of tools upwardly in a vertical direction about a horizontal axis while the other of the right and left wings of tools is stationary; and
   at least one boom actuator in fluid communication with the valve network, the at least one boom actuator configured to rotate one of the right and left booms in support of the one of the right and left wings of tools moved upwardly about a vertical axis in a rearward direction while the other of the right and left wings of tools is stationary;
   wherein the valve network includes a first rotary valve and a second rotary valve each in fluid communication with both a left wing and right wing actuators from the at least two wing actuators, each first and second rotary valve including a selector configured to communicate a fluid flow from a single inlet port to one of two outlet ports, the selector of the first rotary valve mechanically connected to move with the selector of the second rotary valve.

9. The system as recited in claim 8, wherein the at least one wing actuator includes:

the left wing actuator configured to move the left wing of tools, and the right wing actuator configured to move the right wing of tools.

10. The system as recited in claim 8, wherein the at least one boom actuator includes:

a left boom actuator configured to rotate the left boom in support of the left wing of tools about a first vertical axis, and a right boom actuator configured to move the right boom in support of the right wing of tools about a second vertical axis different than the first vertical axis.

11. The system as recited in claim 8, wherein a positive-pressurize fluid flow through the first outlet port of the second rotary valve causes the left wing actuator to move the left wing of tools in the vertical direction while the right wing of tools is stationary, and wherein a positive-pressure fluid flow through the second outlet port of the second rotary valve causes the right wing actuator to move the right wing of tools in the vertical direction while the left wing of tools is stationary.

12. The system as recited in claim 8, wherein the extendible rods of each of the wing actuators and each of the boom actuators is positioned in a fully retracted position when the implement is positioned in the folded, inoperative position ready for transport.

13. The system as recited in claim 8, further including a caster-wheel latch cylinder operable to automatically lock a central caster wheel assembly in forward alignment parallel to the forward direction of travel with position of the right boom in the folded, inoperative position.

14. The system as recited in claim 8, wherein all of the at least one wing actuators and all of the at least one boom actuators are fully retracted when the implement is positioned in the folded, inoperative position ready for transport.

15. An agricultural implement, comprising:

a first boom in support of a first wing of tools located on one side of a central longitudinal axis of the implement;

a second boom in support of a second wing of tools located on another side of the central longitudinal axis opposite the first boom and the first wing of tools;

a system configured to rotate the first wing of tools upwardly in a vertical direction about a horizontal axis and then rotate the first boom about a vertical axis in a horizontal direction while the second wing of tools and the second boom are stationary, the system comprising:

a valve network in fluid communication with a fluid drive source;

at least two wing actuators in fluid communication with the valve network, the at least two wing actuators configured to rotate the first wings of tools upwardly in the vertical direction while the second wing of tools is stationary; and at least two boom actuators in fluid communication with the valve network, the at least two boom actuators configured to rotate the first boom about the vertical axis in the horizontal direction while the second boom is stationary;

wherein the valve assembly includes a plurality of valves each associated with the at least two wing actuators and the at least two boom actuators, each of the plurality of valves including a selector configured to communicate a fluid flow from a single inlet port to one of a first outlet port in fluid communication with at least one of a first wing actuator from the at least two wing actuators and a first boom actuator from the at least two boom actuators and a second outlet port in fluid communication with at least one of a second wing actuator and a second boom actuator, the selector of a first valve from the plurality of valves mechanically connected to move with the selector of a second valve from the plurality of valves.

16. The agricultural implement as recited in claim 15, wherein the at least two wing actuators include the first wing actuator configured to move the first wing of tools, and the second wing actuator configured to move the second wing of tools, and wherein the at least two boom actuators includes the first boom actuator configured to rotate the first boom in support of the first wing of tools about the first vertical axis, and the second boom actuator configured to move the second boom in support of the second wing of tools about a second vertical axis different than the first vertical axis.

* * * * *